United States Patent [19]

Ciliberti

[11] 4,343,631
[45] Aug. 10, 1982

[54] HOT GAS PARTICULATE REMOVAL

[75] Inventor: David F. Ciliberti, Murrysville, Pa.

[73] Assignee: Westinghouse Electric Corp., Pittsburgh, Pa.

[21] Appl. No.: 230,142

[22] Filed: Jan. 30, 1981

[51] Int. Cl.³ .............................................. B01D 46/04
[52] U.S. Cl. ..................................... 55/302; 55/500; 55/523; 55/529; 55/484
[58] Field of Search ............... 55/302, 484, 523, 500, 55/529; 60/311

[56] References Cited

U.S. PATENT DOCUMENTS

| 12,174 | 11/1903 | Draver . | |
|---|---|---|---|
| 645,322 | 3/1900 | Mitchell . | |
| 2,111,906 | 3/1938 | Stewart . | |
| 2,952,333 | 9/1960 | Bush . | |
| 3,343,342 | 9/1967 | Du Rocher . | |
| 3,395,517 | 8/1968 | Lang et al. | 55/302 |
| 3,402,531 | 9/1968 | Farr . | |
| 3,487,609 | 1/1970 | Caplan . | |
| 3,606,735 | 9/1971 | Baigus . | |
| 3,854,902 | 12/1971 | Kalen . | |
| 3,951,627 | 4/1976 | Barr et al. | 55/284 |
| 4,051,898 | 10/1977 | Yoshino et al. | 165/166 |
| 4,080,431 | 3/1978 | Moss | 55/523 |
| 4,276,071 | 6/1981 | Outland | 55/523 |

FOREIGN PATENT DOCUMENTS 12491 6/1980 European Pat. Off. .............. 55/158

OTHER PUBLICATIONS

High Temperature Particulate Control with Ceramic Filters, EPA-600/2-77-207, 10/77, pp. 20, 92, 155.

Primary Examiner—Bernard Nozick
Attorney, Agent, or Firm—L. A. DePaul

[57] ABSTRACT

Filtration system configurations particularly useful for cleaning high temperature raw gas containing fine particulates such as that discharged from coal gasification and fluidized bed combustion processes. Thin filter elements, having elongated clean channels on one side of a gas permeable ceramic membrane and shorter dirty channels on the other side, extend radially outward from a central duct. Raw gas flows about and through the filter elements, and clean gas which permeates the membrane enters the duct. The elements are cleaned by a back pulse of clean air, spitting the particulates to the bottom of the containing vessel and through an outlet. A high density filter packing within a containing pressure vessel is achieved by nesting a plurality of the duct and filter element modules, or through other orientations and filter element configurations.

23 Claims, 11 Drawing Figures

HOT GAS PARTICULATE REMOVAL

BACKGROUND OF THE INVENTION

1. Field of the Invention:

This invention relates to systems and configurations for filtering particulates from hot gaseous mediums.

2. Description of the Prior Art:

Among the many processes being considered for generation of synthetic fuels is gasification of hydrocarbonaceous materials such as coal. Such processes produce a combustible product gas which can be burned for industrial or other use. The gaseous product can also be used in so-called combined cycle plants, where the generated gas is directly used in a gas turbine. However, such plants require a manner in which to remove small particulates of coal, carbon and ash, of less than 5 microns, from the gaseous product, prior to entry into the turbine in order to prevent degradation of the turbine blading.

Many other existing and contemplated uses for carbonaceous materials are being considered. Pressurized, fluidized bed combustion processes, for example, combust coal and transfer heat to a fluid, such as water or air, flowing through tubes passing through the containing vessel. The combustion products, which can be expanded through turbines, will also have to be filtered from this process, and in addition will include particulate absorbent such as limestone or dolomite dust.

The product discharged from the various systems is not only abrasive, but also is discharged at a high temperature. For example, fluidized bed combustion processes discharge raw product gas at temperatures in the range of 1200° to 1800° F., providing imitations on filter materials. Conventional devices for hot gases, such as cyclones, are useful for removing larger particulates, but are of limited value in removal of particulates smaller than 5 to 10 microns. More advanced concepts in hot gas cleaning, for example, a granular bed filter design, have shown promise for fine particulate removal, but rely on large and cumbersome equipment.

It is desirable to provide filtration systems which meet the stringent requirements imposed by high temperature gases containing fine particulates.

SUMMARY OF THE INVENTION

This invention provides filtration systems in configurations capable of efficiently removing the particulates, less than 5 microns, from high temperature gaseous streams. It is particularly useful for cleaning the raw gaseous discharge from coal gasification and pressurized fluidized bed combustion processes. A plurality of filter elements, having a high surface area to volume ratio, are arranged not only to effectively remove the fine particulates, but also to provide ready removal of the particulates from the filters and their containing vessel.

The preferred filter element is a commonly-known type orginally intended for use as a catalyst support for a recuperative catalytic converter for automotive application and cross flow heat exchangers. It includes a series of gas permeable ceramic membranes separated by corrugated sheets, which can also be permeable to the gas. The corrugations on one side of the membrane are oriented perpendicular to the corrugations on the other side of the membrane. In the systems disclosed, other angular relations can be utilized. Each filter element has large frontal and rear raw gas inlets, and a relatively small side outlet. For example, each filter can be shaped as a thin rectangular box.

Each filter extends radially outward from an inner tubular duct, so that the small filter outlet discharges filtered gas into the duct. The oppositely disposed face of the filter element is capped or cemented closed. A plate-like shroud can also extend radially outward from the duct, between consecutive filters. The filters, shrouds and a portion of the duct are contained within a sealed vessel. The duct can extend through the vessel, including extension through a clean gas and a dirty gas plenum within the vessel, where both are utilized.

Pressurized raw gas containing particulates flows through the inner duct, is prevented from further passage through the duct by a plate, and is radially discharged, through openings in the duct wall, into the lower end of the vessel. The raw gas then flows to the large frontal and rear inlet areas of the filter elements. The raw gas enters the elements in a direction normal to the radially disposed elements. The gas permeates the membranes, changes direction by 90°, and is discharged as clean gas radially into the inner duct. The particulate material remains as a dust on the higher pressure side of the filter element membranes. The clean gas exits the vessel through the inner duct.

To clean the elements, the process is reversed. A clean purge gas is pulsed or continuously driven into the vessel through the outlet end of the duct. The purge spits the collected dust onto the shrouds. The dust then falls to the bottom of the vessel, and is carried by the purge gas into the duct and out of the vessel.

In order to provide a higher density of filter elements within the vessel, a plurality of filter modules are utilized. Each module is similar to the configuration described, including a central duct with outwardly extending filter elements. Each module, for example, includes four sets of radially extending filter elements, so as to form a cross-shaped configuration. The cross-shaped modules are nested within the vessel. Raw gas enters the vessel from the side inlet, and flows through the filter elements into the duct of each module. The clean gas is discharged from the ducts into an upper plenum within the vessel defined by a support plate from which the modules are suspended. The gas from each module is mixed in the plenum, and discharged through an outlet at the top of the vessel. A reverse cleaning purge blows the dust from the elements to the bottom of the vessel, where it is removed through a lower outlet. Such filter systems can operate continuously by providing individual purge lines to each module.

Additional configurations, utilizing a central duct, are also disclosed. The configurations present a large filter area to pressure vessel volume ratio which provides compact, economical and efficient filtration.

BRIEF DESCRIPTION OF THE DRAWINGS

The advantages, nature and additional features of the invention will become more apparent from the following description, taken in connection with the accompanying drawing in which.

DESCRIPTION OF THE PREFERRED EMBODIMENTS

Figure 1A:
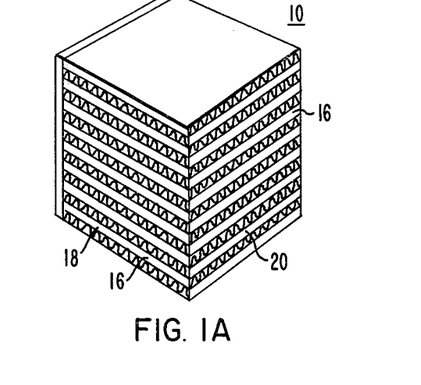
FIGS. 1A and 1B are perspective views of a gas permeable filter element.
Figure 1B:
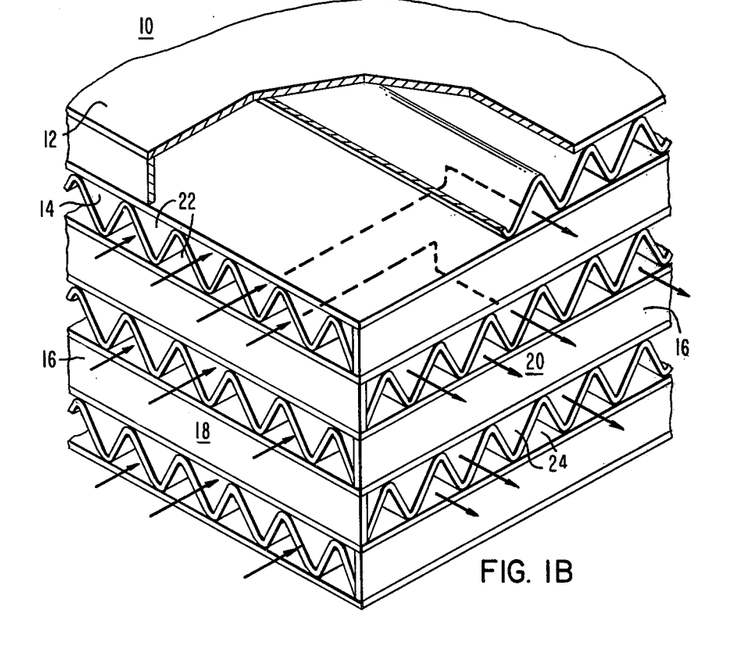

Referring now to FIGS. 1A and 1B there is shown a commonly-known type of filter 10. The filter 10 is comprised of alternating layers of a gas permeable membrane 12, preferably ceramic, and a corrugated sheet 14. The membrane is comprised of a material which is operable in a high temperature environment, is gas permeable, and which is impermeable to fine particulates, particularly particulates in the 0+ to 5 micron range, typical of the smallest particles contained in the raw gas discharged from a fluidized bed gasification reactor for coal, or from similar carbonaceous materials and processes. The membrane can, for example, be comprised of cordierite ($2MgO.2Al_2O_3.5SiO_2$), aluminum silicate, magnesium silicate, alumina or similar materials. The corrugated sheet 14, which channels the medium of interest, can be gas permeable, and can also be, though preferably is not, permeable to the particulates. Preferred materials include the same materials as that utilized for the membrane, as well as other ceramic materials of similar coefficient of expansion. Where similar materials are utilized for the membranes and corrugated sheets, concerns over differential thermal expansion are alleviated. Filters of this type have been commercially available in the past from the 3M Corporation under the trade name "Thermocomb", from the W. R. Grace Company under the trade name "Poramic", and are presently available from the Coors Porcelain Company in experimental quantities.

As shown, the corrugations on one side of each membrane 12 are positioned at an angle to the corrugations on the other side of the membrane. All known filters of this type have angled the opposing channels at 90°. Caps 16 are provided between every other set of consecutive membranes 12 along one face 18 of the filter 10, and between alternate consecutive membranes on the adjacent face 20. Thus, gas at an elevated pressure enters the filter through a face 18, flows through inlet channels 22 formed by the corrugations, permeates the membrane 12, and enters outlet channels 24 formed by the corrugated sheet 14 on the opposite side of the membrane 12. The gas, having changed direction by 90°, exits the filter 10 at the adjacent face 20. Fine particulates contained in the gas are retained as a dust on the higher pressure side of the membranes 12, and may also be retained on the corrugated sheets 14. Accordingly, the inlet channels 22 are herein also referred to as dirty channels, and the outlet channels are also referred to as clean channels.

In accordance with the invention, corrugations other than the sinusoidal configurations shown can be utilized. The W. R. Grace and Coors materials are provided with a squarewave shape. Preferably the distance among consecutive membranes is small in order to provide a maximum surface area to volume ratio. Limiting the closeness of the membranes is the ability to back purge for the cleaning process. The membranes should be spaced as close as possible while maintaining the ability to be readily cleansed, in order to achieve a dense filter packing. Spacing as close as one-eighth of an inch is possible.

Figure 2:
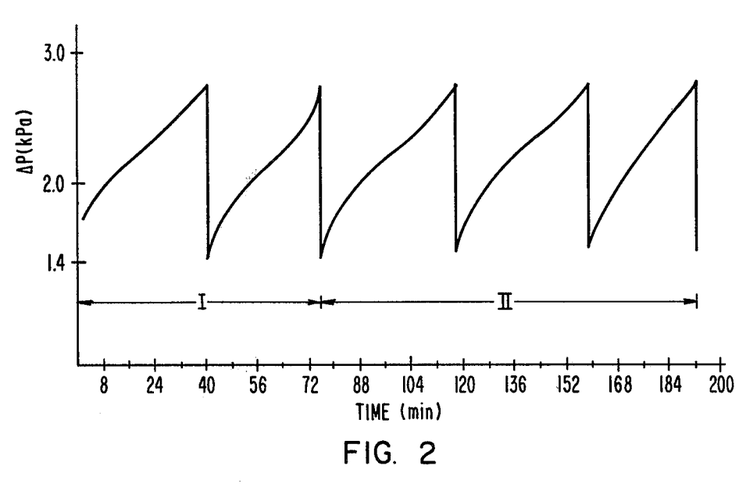
FIGS. 2 and 3 are graphical representations of test data, plotting time (minutes, x-axis) versus pressure drop (kPa, y-axis)
Figure 3:
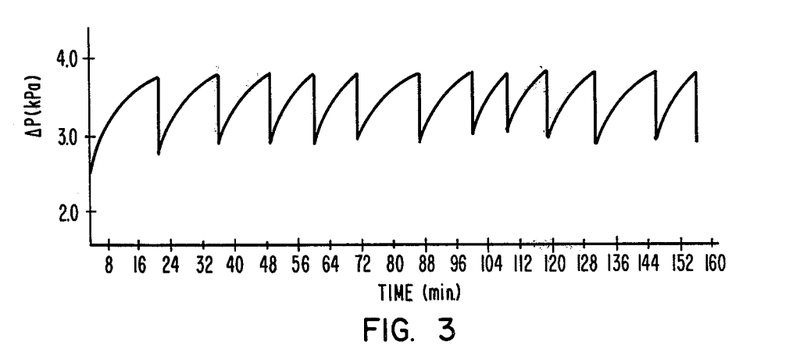

FIGS. 2 and 3 are graphical representations of test data obtained on two inch cubic sample filters of Thermocomb. The sample from which the data of FIG. 2 were generated was run at ambient temperature, approximately 27° C. The filter area, the area of one surface of each of the membranes, was 0.0227 $m^2$, and the filter was exposed to a constant flow rate of air containing limestone dust with a mass-medium diameter of about two microns, at 0.0425 $m^3$/min. The vertical lines represent a purge with clean air at a pressure of 30 psig for approximately one-half second. The average concentration of the dust in the air during the first portion of the test, noted I, was 2.57 gm/$m^3$; during the second portion of the test, noted II, it was 5.62 gm/$m^3$. The filtration efficiency was 98.3 percent.

The sample from which the data of FIG. 3 were generated was run at a substantially increased temperature, 968° K. The filter area was also 0.0227 $m^2$, and a constant flow of the air and particulates was run through the filter at a rate of 0.094 $m^3$/min. The purge duration was 0.6 second during the first six cycles at 137.9 kPa, and 3 seconds subsequently. The filtering efficiency was 99.99 percent.

The tests show the filter material to be an efficient fine particulate filter, at high temperature, exhibiting close to 100 percent filtration efficiency. Complete cleaning was achieved in the small sample units by a short pulse of clean air from the clean side of the filter. The data also show pressure drop flow characteristics not dissimilar to more conventional fabric-bag filters. The filter material can readily operate at the high temperatures required of a hot-gas cleaning system for coal gasification and combustion technologies. Additional study of the Thermocomb material has shown an excellent resistance to thermal shock, a good mechanical strength, and chemical resistance to the hostile gaseous environment provided by fluidized bed combustion and other coal based processes.

Experiments with larger samples, six inch cubes, revealed a potential concern in scaling up to larger filter sizes. There was difficulty in removing all of the limestone dust. It is believed that this concern may be alleviated by altering the corrugation structure in a manner which retains the cross-flow properties and which enlarges the effective channel widths.

Figure 4:
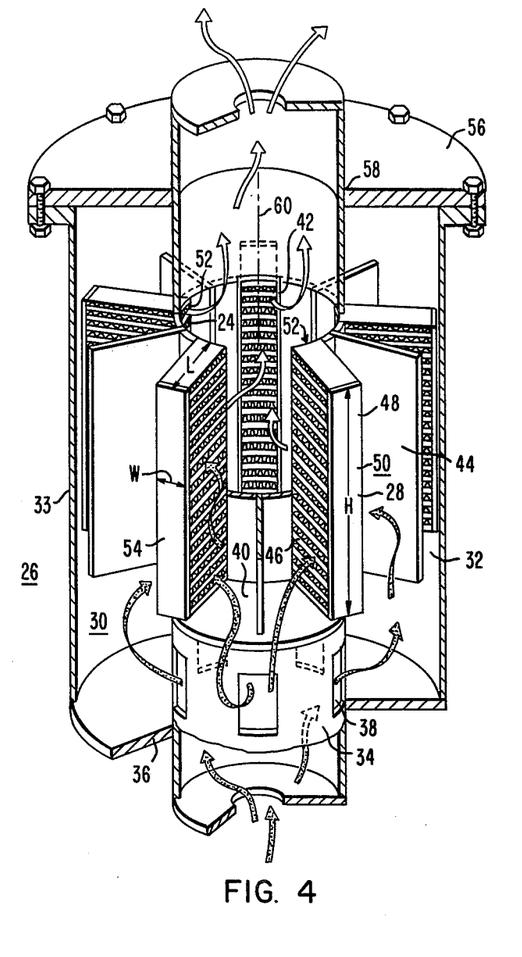
FIG. 4 is a sectional perspective view of a filtration system in accordance with the invention showing normal flow paths.

FIG. 4 presents a filtration system 26 configuration which utilizes the filter to achieve a high filter surface area to pressure vessel volume ratio in a unit which is efficient and simple in operation. The scale concerns are alleviated by configuring the filter material into useable filter elements 28 which are sized and positioned such that the dirty (inlet) channel length is small compared to the clean (outlet) channel length, which insures adequate cleaning. Further, each dirty side channel has two inlets, so that the distance a particle must travel during a cleaning purge is effectively cut in half. Dirty side channel lengths of three inches have been successfully cleaned in channels having a single open end, approximately one-eighth inch square.

Figure 5:
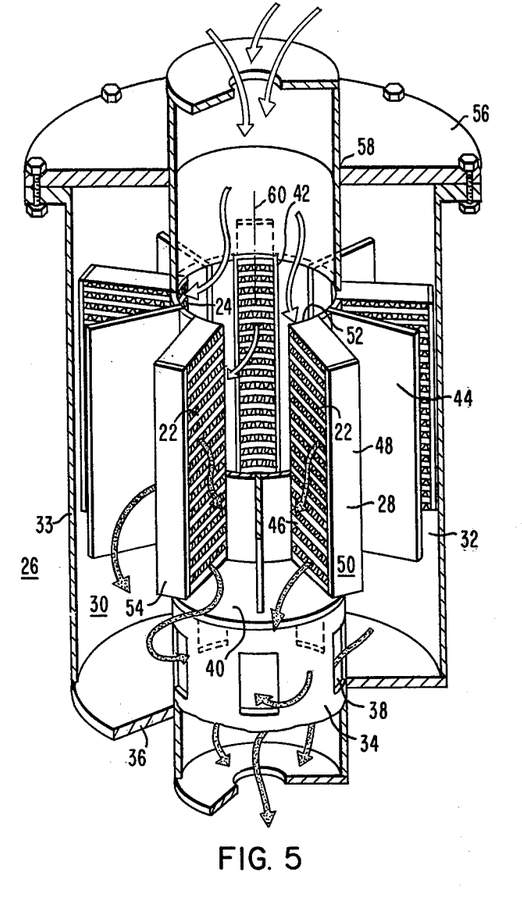
FIG. 5 is a view, similar to FIG. 4, showing flow paths during cleaning of the system.

Dirty gas, for example, raw gas discharged from a process for gasification of carbonaceous materials, such as coal, enters the internal volume 30 of sealed vessel 32 having a cylindrical wall 33. In FIGS. 4 and 5, the dark arrows represent flow paths of dirty gas, and the light arrows represent flow of a clean gas. The discharge into the vessel 32 can be through one or more inlets. In preferred form, an inner duct 34 extends upwardly through the bottom 36 of the vessel 32. The inner duct 34 includes openings 38 at an elevation close to the bottom of the vessel, which radially discharge the raw gas into the internal volume 30. Preferably at least one opening 38 is oriented between consecutive filter elements 28. Shrouds 44 can also extend radially outward from the duct 34, between consecutive filter elements 28. The elements 28 and shrouds 44 can extend to the vessel 32 wall, and preferably are slightly spaced from the wall to accommodate thermal expansion.

As will be noted, filtered particulates can eventually be discharged from the bottom 36 of the vessel back into the duct 34. Accordingly, the openings 38 preferably extend downward to or below the upper surface of the vessel bottom 36. The bottom 36 can also be slanted toward the openings 38 and the duct 34, and can also be hemispherical.

The duct is provided with means for deflecting the flow outwardly from the duct 34 into the lower volume 30, such as a flow barrier plate 40. Above the elevation of the plate 40, the plurality of filter elements 28 extend radially outward from the duct 34, the outlet channels being in flow communication with the interior space of the duct. The elements 28 are preferably sealed to the duct wall by Fiber Frax gaskets 42, (one shown) commercially available from the Carborundum Company.

Each filter element 28 is configured such that the clean side channel length is substantially greater than the dirty side channel length. An aspect ratio of channel length to channel cross-sectional area is larger for the clean side channels than for the dirty side channels. Preferably this ratio is at least two to six times the dirty side ratio. It desirably is three to one for inlet and outlet channel openings approximately one-eighth inch square. This ratio can readily be achieved by sizing and configuring the elements 28 as thin rectangular or square boxes. Other configurations are equally possible, including that shown in FIG. 11. The filter elements 28 shown in FIG. 4 have a length L, a width W and a height H. Exemplary dimensions are L=6 inches, W=2 inches and H=6 inches.

The length and height define a dirty gas frontal inlet area 46 and a rear inlet area 48. The inlet channels 28 begin at the inlet areas 46, 48, and thus have two ends open to the vessel internal volume. The height and width define a first side area 50, and a clean gas outlet side area 52. The first side area 50 is cemented shut or sealed with a plate 54, to prevent entry of the dirty gaseous medium into the clean side channels 24. The outlet side area 52 and outlet channels 24 are exposed to and are in fluid communication with, the inside of the inner duct 34. The outlet channels thus have one end closed and one end open to the duct interior. The duct 33 penetrates a top head 56 to form an outlet 58.

During operation, a hot, dirty gaseous medium containing particulates flows upwardly through the inner duct 34, and is radially discharged into the lower section of the vessel 32. The dirty gas then flows to the inlet areas 46, 48 of the filter elements 28. The dirty gas enters the elements generally in a direction normal to an axis 60 of the radially oriented elements. The dirty gas flows through the inlet channels 22, and the gas permeates the membranes 12. The gas is then directed through the outlet channels 24, along the axis 60, and is discharged from the element as a clean gas into the inner duct 34. In this mode of operation, the only discharge into the portion of the duct 34 above the barrier 40 is from the filter elements. The particulates remain on the inlet channel 22, high pressure side of the membranes.

To clean the filter elements 28, the process is basically reversed, as shown in FIG. 5. A continuous, or preferably a pulsed flow of a clean gas, such as air, enters the outlet 58 at the top of the vessel through the inner duct 34. The clean gas flows through the outlet channels 24 and the membranes 12, causing the collected dust to be discharged from the inlet channels 22. The dust is discharged onto the shrouds 44 and falls to the bottom 36 of the vessel. The dust can be removed from the vessel by closing the openings 38 and discharging through a lower nozzle (not shown), or, preferably, the dust is blown by the purge into the inner duct, through the openings and is removed from the duct at an elevation below the vessel.

Figure 6:
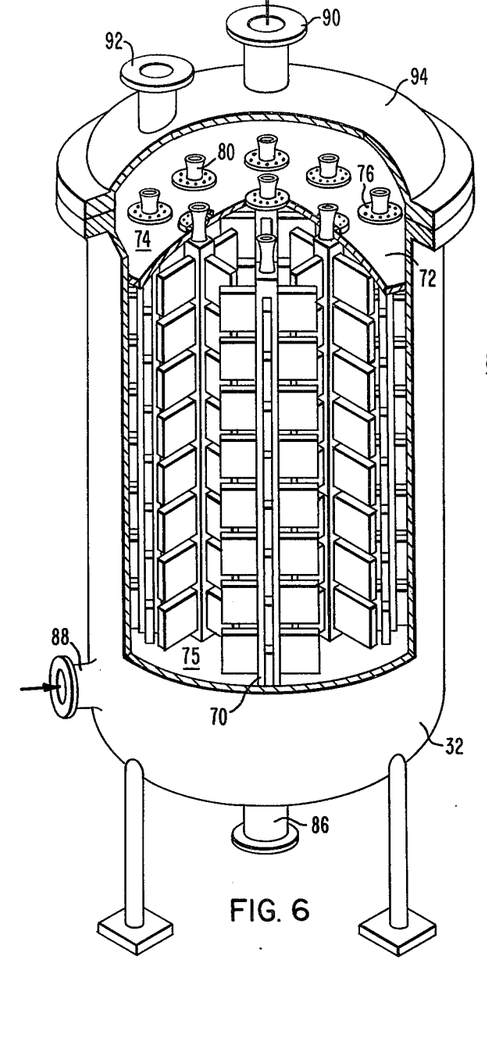
FIG. 6 is a sectional perspective view of another filtration system in accordance with the invention.
Figure 7:
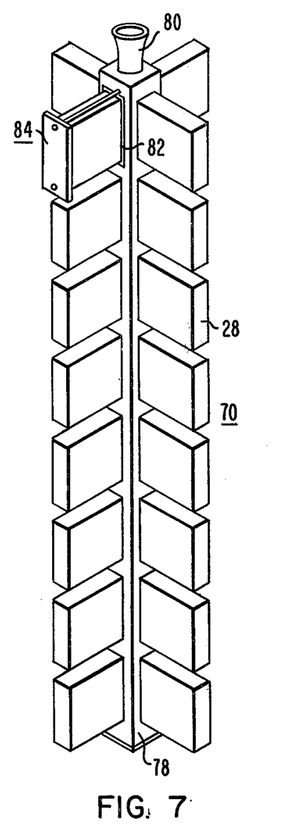
FIG. 7 is a perspective view of a filter module of FIG. 6.

A limitation of the system disclosed in FIGS. 4 and 5 is that as the radial dimension is increased for larger units, the filter area per unit volume within the vessel is reduced. An alternative configuration which maintains a higher filter area to volume ratio is shown in FIGS. 6 and 7. A plurality of filter modules 70 are suspended within the sealed vessel 32 from an upper barrier or support plate 72, which forms an upper plenum 74 and a lower plenum 75 within the vessel. Each module 70 is suspended from, and sealed to, the support plate 72 by bolts 76 or other fastening means. The bottom of the module is free, or can be laterally supported from the bottom of walls of the vessel. Thus, differential axial thermal expansion among the modules and the vessel components is accommodated.

The vessel also includes penetrations including a collected dust outlet 86, a dirty gas inlet 88, a clean gas outlet 90, and a purge gas inlet 92. Preferably one or more inlets 88 are disposed at an elevation above the outlet 86.

Each individual module 70 is similar to the duct and filter element configuration of FIGS. 4 and 5. Each module includes a central duct 78, of rectangular or other shape, which is closed at the bottom and open at the top. The filter elements 28 are arranged in four columns in the shape of a cross. This allows the modules to be nested, each being closely spaced with respect to adjacent modules, providing a high density of filter elements within the vessel 32. Nesting is accomplished, for example, by rotating each module at 45° with respect to an adjacent module, and spacing the center-to-center distance among adjacent modules at less than two times the distance from the center of the module to the far edge of the filter elements. Short shrouds can also be utilized. Each module can also include means for increasing the velocity of the reverse flow cleaning pulse, such as a venturi nozzle 80. The filter elements are seated and sealed to the duct by a Fiber Frax gasket 82 (one shown).

One end of each filter is sealed by a stud and bar clamp assembly 84 (one shown), which also attaches the elements 28 to the central duct 78.

Figure 8:
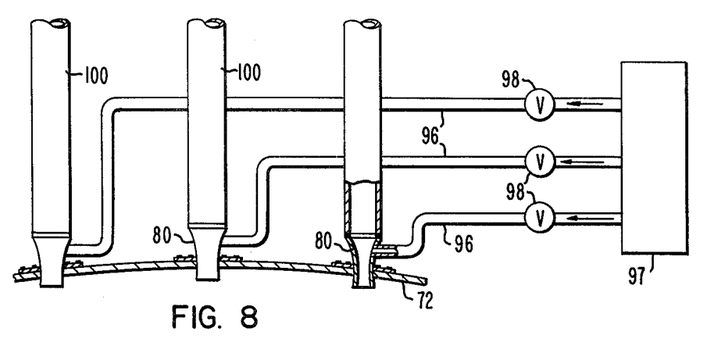
FIG. 8 is a schematic showing interconnection between a purge-gas source and individual filter modules in accordance with the invention.

As shown in FIG. 6, clean gas is discharged from each module into the common upper plenum 74. Alternatively, the support plate 72 can be eliminated and the upper nozzle 80 of each module can independently penetrate a vessel head 94. Whether the nozzles are disposed within or external to the vessel, a high pressure source 97 of purge gas (FIG. 8) can communicate with the nozzles through conduits 96. The conduits 96 can penetrate the vessel through sealed inlet 92. Each conduit 96 has a normally closed quick acting valve 98 which can be opened to purge a single module, thus allowing continuous operation of the system. For the system shown in FIG. 6, the modules can be simultaneously purged by a single large pulse into the upper plenum. Preferably, however, individual modules are selectively cleaned one at a time through the individual purge conduits 96.

Operation of the system is similar to that previously described, with dirty gas entering the vessel 32 through one or more inlets 88, and flowing to and through the filter elements 28. Clean gas is discharged into the upper plenum 74, or to conduits 100. Collected dust is removed and the filter elements 28 cleaned by a back pulse of clean air through purge gas inlet 92, which blows the particulates into the vessel lower plenum volume and to the dust outlet 86.

Figure 9:
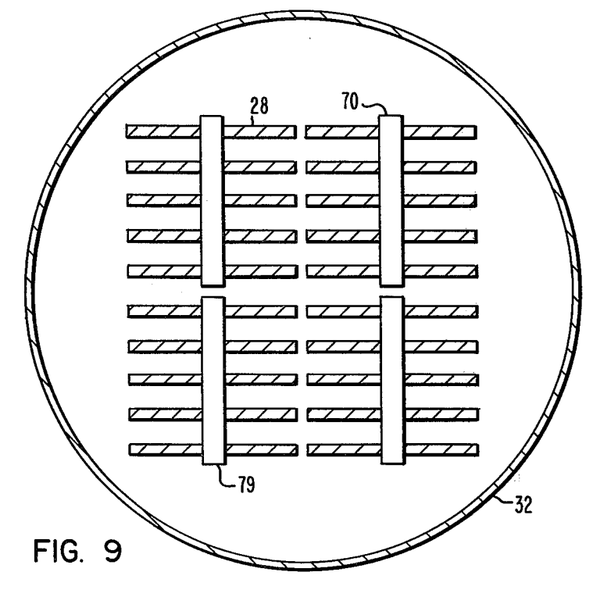
FIG. 9 is a plan view, in section, of an alternative filter module arrangement.

Additional advantageous configurations are possible. FIG. 9 shows a system wherein modules 70 have a plurality of filter elements 28 extending outwardly from a rectangular duct 79. This configuration can provide a dense module packing within a vessel 32.

Figure 10:
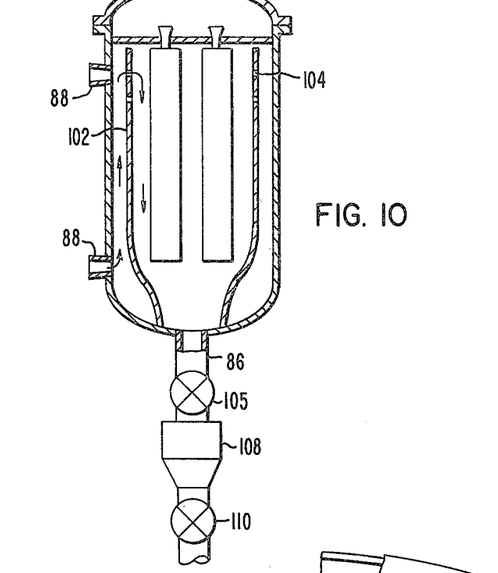
FIG. 10 is a schematic elevation view of yet another embodiment of the invention.

For a fluidized bed gasification system, dirty gas will enter the vessel at approximately seven to fifteen atmospheres of pressure. For cleaning while maintaining continuous operation, a purge pulse must exceed this pressure. The system can also include features which alleviate any undesirable interaction between the dirty gas entering the vessel and the downwardly flowing purged particles. As shown schematically in FIG. 10, one or more of the inlet nozzles 88 can be placed high in the vessel, to promote a generally downward flow. A generally downward flow can also be promoted by utilization of a baffle 102 having upper perforations 104. The baffle 102 can also be shaped to direct falling particulates toward the outlet 86. From the outlet 86, the particles pass through a flow controller 105, such as a star-wheel valve, to a holding lock hopper 108, and eventually through another valve 110 to ultimate discharge.

Figure 11:
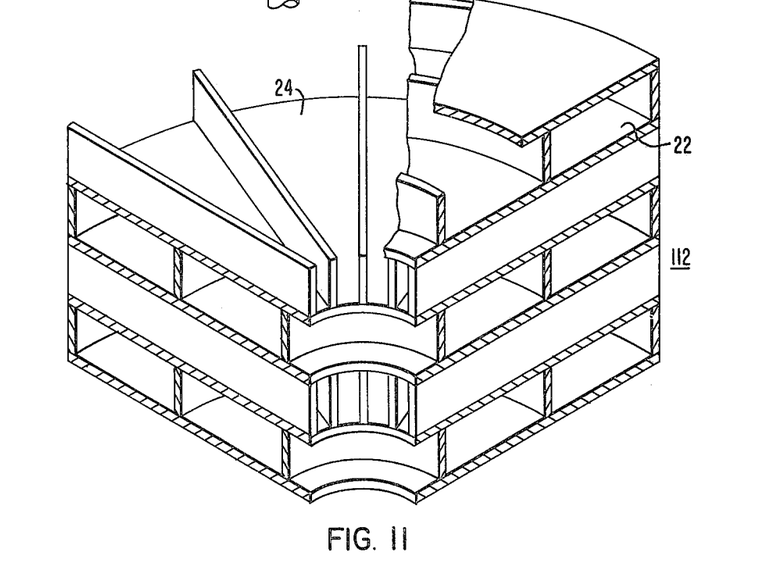
FIG. 11 is a partially sectioned perspective view of a filter element in accordance with another embodiment of the invention.

In all of the disclosed configurations, the inlet and outlet channels are preferably straight and oriented at 90° to one another. Other shapes and angular relations can also be beneficial, particularly where dense packing is required. As shown in FIG. 11, filter elements 112 can be arcuate in nature. The clean side channels 24 are pie cut shaped sectors, and the dirty side channels 22 are formed as concentric flow paths. Attachment of elements 112 to a cylindrical duct will enhance the packing density within a cylindrical pressure vessel.

There have been described filtration system configurations with large filter area to volume ratios, capable of removing fine particulates from a high temperature gaseous medium. Since numerous changes may be made in the described apparatus without departing from the scope thereof, it is intended that the foregoing description be taken as illustrative, and not in a limiting sense.

I claim:

1. Apparatus for filtering particulates from a mixture of particulates in a high temperature gas, comprising:
    a vessel having an internal volume;
    a duct fixed to and disposed within said vessel, said duct having interior space;
    a plurality of filter elements affixed to and extending outwardly from said duct, said elements having inlet channels in fluid communication with said vessel internal volume and outlet channels in fluid communications with said duct interior space, said inlet and outlet channels being separated by a ceramic membrane permeable to said high temperature gas and impermeable to said particulates;
    means for conducting said mixture to said vessel internal volume;
    means for conducting said high temperature gas out of said duct to a point external to said vessel; and
    means for conducting said particulates removed from said high temperature gas from said vessel.

2. The apparatus of claim 1 wherein said duct extends through said vessel, and further comprising means for segregating said duct interior into a dirty portion and a clean portion, and wherein said means for conducting said mixture to said vessel internal volume include openings in said dirty portion of said duct.

3. The apparatus of claim 1 further comprising means for flowing a clean purge gas serially into said duct, through said outlet channels, said membrane, said inlet channels and into said vessel internal volume.

4. The apparatus of claim 1 further comprising shrouds extending outwardly from said duct, each said shroud being positioned between consecutive filter elements.

5. The apparatus of claim 1 wherein the ratio of inlet channel length to inlet channel cross-sectional area is smaller than the ratio of outlet channel length to outlet channel cross-sectional area.

6. The apparatus of claim 1 wherein each said inlet channel has two ends, both of said ends being open to said vessel internal volume, and wherein each said outlet channel has two ends, one of said outlet channel ends being closed and the other being open to said duct interior space.

7. The apparatus of claim 1 wherein said inlet and outlet channels are oriented generally perpendicular to one another, and wherein each said outlet channel is two to six times the length of each said inlet channel.

8. The apparatus of claim 7 wherein each said filter element is shaped as a rectangular box having a length of approximately six inches, a height of approximately six inches, and a width of approximately two inches.

9. The apparatus of claim 1 wherein said duct is circular in cross-section and said filter elements extend radially outward from said duct.

10. The apparatus of claim 9 wherein said inlet channels are arcuate and said outlet channels extend radially outward from said duct.

11. Apparatus for filtering particulates from a mixture of particulates in a high temperature gas comprising:
    a vessel having a first plenum and a second plenum;
    a plurality of filter modules supported within said vessel, each said module including a duct having an interior space and a plurality of filter elements attached to and extending outwardly from said duct, said duct interior space being in flow communication with said first plenum, said filter elements being disposed within said second plenum, each said filter element having a plurality of inlet channels open to said second plenum and a plurality of outlet channels open to said duct interior space, said inlet and outlet channels being separated by a ceramic membrane permeable to said high temperature gas and impermeable to said particulates;

means for conducting said mixture to said second plenum;

means for conducting said high temperature gas from said frist plenum; and means for conducting said particulates removed from said high temperature gas from said vessel.

12. The apparatus of claim 11 wherein each said duct is circular in cross-section and said filter elements extend radially outward from said duct.

13. The apparatus of claim 11 wherein said inlet channels are arcuate and said outlet channels extend radially outward from said duct.

14. The apparatus of claim 11 wherein the ratio of inlet channel length to inlet channel cross-sectional area is smaller than the ratio of outlet channel length to outlet channel cross-sectional area.

15. The apparatus of claim 11 wherein each said inlet channel has two ends, both of said ends being open to said second plenum, and wherein each said outlet channel has two ends, one of said outlet channel ends being closed and the other being open to said duct interior space.

16. The apparatus of claim 11 wherein said inlet and outlet channels are oriented generally perpendicular to one another, and wherein each said outlet channel is two to six times the length of each said inlet channel.

17. The apparatus of claim 16 wherein each said filter element is shaped as a rectangular box having a length of approximately six inches, a height of approximately six inches, and a width of approximately two inches.

18. The apparatus of claim 11 wherein said modules comprise a venturi extending into said first plenum.

19. The apparatus of claim 11 further comprising means for discharging a clean purge gas into said first plenum.

20. The apparatus of claim 11 further comprising means for selectively discharging a clean purge gas into each said duct of said modules.

21. The apparatus of claim 20 wherein said selective discharge means comprise a pressurized clean gas source disposed outside of said vessel and conduits extending from said source to each said duct.

22. The apparatus of claim 11 wherein said vessel is vertically oriented, said first and second plena are formed by a horizontally disposed barrier such that said first plenum is above said second plenum, and wherein said modules are suspended from said barrier.

23. The apparatus of claim 22 wherein said vessel is circular in cross-section, and further comprising a baffle concentrically disposed within said vessel about said modules.

* * * * *